US012397601B2

(12) United States Patent
Tokunaga et al.

(10) Patent No.: US 12,397,601 B2
(45) Date of Patent: Aug. 26, 2025

(54) SHOCK ABSORBER AND BRACKET

(71) Applicant: Hitachi Astemo, Ltd., Hitachinaka (JP)

(72) Inventors: Kosuke Tokunaga, Hitachinaka (JP);
Hirohito Ishii, Hitachinaka (JP);
Yutaka Kuroda, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/730,535

(22) PCT Filed: Jan. 5, 2023

(86) PCT No.: PCT/JP2023/000035
§ 371 (c)(1),
(2) Date: Jul. 19, 2024

(87) PCT Pub. No.: WO2023/149152
PCT Pub. Date: Aug. 10, 2023

(65) Prior Publication Data
US 2025/0100339 A1 Mar. 27, 2025

(30) Foreign Application Priority Data
Feb. 3, 2022 (JP) ................. 2022-015777

(51) Int. Cl.
B60G 13/00 (2006.01)
(52) U.S. Cl.
CPC ...... B60G 13/006 (2013.01); B60G 2204/129 (2013.01); B60G 2206/41 (2013.01)
(58) Field of Classification Search
CPC .................................................. B60G 13/006
See application file for complete search history.

(56) References Cited

U.S. PATENT DOCUMENTS 5,669,728 A    9/1997  Koba
6,533,230 B2 *  3/2003  Fullenkamp .......... B60G 15/07
                                              248/300
(Continued)

FOREIGN PATENT DOCUMENTS

EP    0716943 A1 *  6/1996
FR    2975315 A1 * 11/2012  .......... B60G 13/006
(Continued)

OTHER PUBLICATIONS

International Search Report issued Mar. 7, 2023 in International Application No. PCT/JP2023/000035, with English translation.
(Continued)

Primary Examiner — Nicole T Verley
(74) Attorney, Agent, or Firm — Wenderoth, Lind & Ponack, L.L.P.

(57) ABSTRACT

Provided are a shock absorber and a bracket which are improved in attachment rigidity. A cylindrical portion is shaped by press-forming first and second holes in sheet material (flat plate) and then curving the sheet material into a tube, in which a bridge portion is formed between the first and second holes. The bracket is thus improved to have higher formability as compared to conventional brackets which are not provided with a bridge portion. This improves the accuracy (cylindricity, in particular) of the cylindrical portion. It is then possible to improve the shock absorber in attachment rigidity against a lateral force to the anteroposterior direction of a vehicle in a situation where the bracket is used to attach the shock absorber to the knuckle.

8 Claims, 6 Drawing Sheets

(56) References Cited

U.S. PATENT DOCUMENTS

| | | | | |
|---|---|---|---|---|
| 6,692,012 | B2* | 2/2004 | Fullenkamp | B60G 15/063 |
| | | | | 267/179 |
| 7,022,932 | B2* | 4/2006 | Hatakeyama | B60G 13/006 |
| | | | | 219/61 |
| 2002/0125382 | A1* | 9/2002 | Fullenkamp | B60G 15/07 |
| | | | | 248/200 |
| 2019/0309816 | A1 | 10/2019 | Shibata et al. | |
| 2022/0213944 | A1 | 7/2022 | Shibata et al. | |

FOREIGN PATENT DOCUMENTS

| | | | | | |
|---|---|---|---|---|---|
| JP | 8-58330 | | 3/1996 | | |
| JP | H11280825 | A * | 10/1999 | | |
| JP | 2000018309 | A * | 1/2000 | | B60G 13/006 |
| JP | 2015197129 | A * | 11/2015 | | |
| JP | 2018-25224 | | 2/2018 | | |
| JP | 6289217 | B2 * | 3/2018 | | |
| WO | WO-2022009511 | A1 * | 1/2022 | | B60G 13/006 |
| WO | WO-2022113537 | A1 * | 6/2022 | | B60G 13/005 |

OTHER PUBLICATIONS

Written Opinion of the International Searching Authority issued Mar. 7, 2023 in International Application No. PCT/JP2023/000035, with English translation.

* cited by examiner

SHOCK ABSORBER AND BRACKET

TECHNICAL FIELD

The invention relates to a shock absorber disposed between a vehicle body and a wheel and a bracket that is provided at an outer periphery of a shock absorber and coupled to a wheel-side knuckle.

BACKGROUND ART

Patent Literature 1 discloses a bracket (hereinafter, referred to as a "conventional bracket") including a tube-like portion (cylindrical portion) having a C-shaped cross section which encloses the outer periphery of an outer shell and has a split in a front portion, and a pair of attachment portions (extending portions) protruding radially outwards from respective circumferential ends of the tube-like portion, the tube-like portion being provided with a hole that is formed to avoid interference with a protruding portion (valve case).

CITATION LIST

Patent Literature

PTL 1: Japanese Patent Application Publication (Kokai) No. 2018-25224

SUMMARY OF INVENTION

Technical Problem

A conventional bracket includes a hole for allowing a protruding portion to extend therethrough. The hole is formed to extend from both side portions to a rear portion of the tube-like portion. The tube-like portion is shaped by press-forming a hole in sheet material (flat plate) and then curving the sheet material into a tube in which the hole is formed. However, it is difficult to shape the sheet material (flat plate) that is widely open at the center into a tube with high accuracy (cylindricity, in particular). The accuracy of the tube-like portion is related to shock absorber attachment rigidity against a lateral force to the anteroposterior direction of a vehicle in a situation where the shock absorber is attached to a knuckle through the bracket. An issue is therefore to improve attachment rigidity by improving the formability of the bracket.

An object of the invention is to secure attachment rigidity of a shock absorber in which a hole for avoiding interference of a bracket with a protruding portion is formed and provide a bracket that is capable of securing attachment rigidity of a shock absorber.

Solution to Problem

A shock absorber of the invention comprises a tube-like cylinder, a protruding portion that is so provided as to protrude in a radially outward direction of the cylinder, and a bracket that is provided at an outer periphery of the cylinder. The bracket comprises a cylindrical portion including a first end portion and a second end portion in a circumferential direction of the cylindrical portion, the cylindrical portion having a cross-section in an axial direction of the cylindrical portion, the cross-section being formed into a C-shape, the cylindrical portion covering the outer periphery of the cylinder; a pair of extending portions respectively extending from the first end portion and the second end portion of the cylindrical portion in the radially outward direction of the cylindrical portion so as to face each other; a first hole that is provided in the cylindrical portion and allows the protruding portion to extend through the first hole in the radially outward direction of the cylindrical portion; a second hole that is provided in the cylindrical portion and disposed apart from the first hole; and a bridge portion that is formed between the first hole and the second hole and provided on an opposite side of an axial center of the cylindrical portion from the pair of extending portions.

A bracket of the invention is a bracket that is provided to cover an outer periphery of a shock absorber disposed between a vehicle body and a wheel and coupled to a knuckle on the wheel side. The bracket comprises a cylindrical portion including a first end portion and a second end portion in a circumferential direction of the cylindrical portion, the cylindrical portion having a cross-section in an axial direction of the cylindrical portion, the cross-section being formed into a C-shape; a pair of extending portions respectively extending from the first end portion and the second end portion of the cylindrical portion in a radially outward direction of the cylindrical portion so as to face each other; a first hole that is provided in the cylindrical portion and extends through the cylindrical portion; a second hole that is provided apart from the first hole and extends through the cylindrical portion; a bridge portion that is formed between the first hole and the second hole on a circumferentially opposite side of the cylindrical portion from a center position of the cylindrical portion which is located between the first end portion and the second end portion; and reinforcing portions that are provided in the radially outward direction of the cylindrical portion and formed to extend from the cylindrical portion to the respective extending portions.

One embodiment of the invention makes it possible to secure attachment rigidity of a shock absorber in which a hole for avoiding interference of a bracket with a protruding portion is formed.

DESCRIPTION OF EMBODIMENTS

One embodiment of the invention will be explained with reference to the attached drawings.

Figure 1:
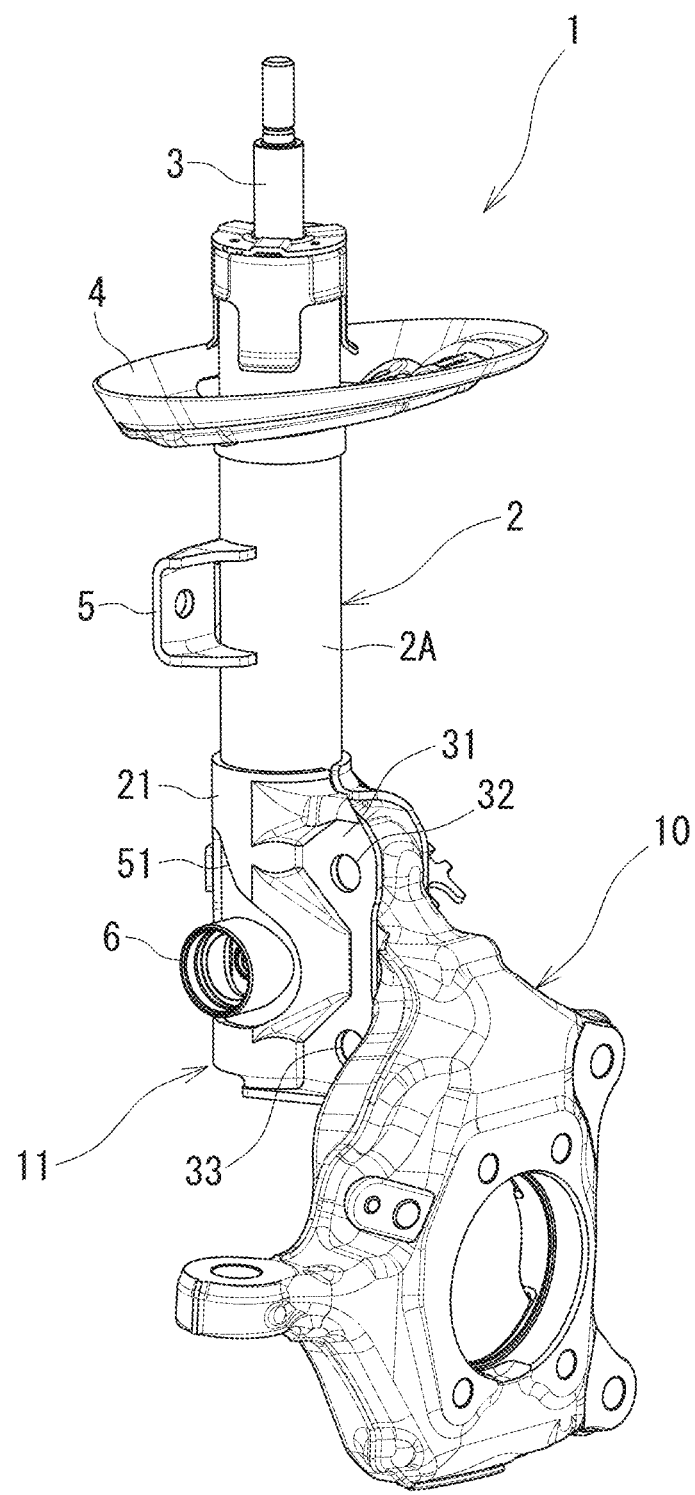
FIG. 1 is a perspective view showing an attachment structure of a shock absorber according to an embodiment of the invention.

FIG. 1 is a perspective view showing a condition in which a shock absorber 1 of a suspension apparatus, not shown, is coupled to a wheel-side knuckle 10. For the sake of convenience, an up-and-down direction in FIG. 1 will be referred to as "vertical direction" or "axial direction." The shock absorber 1 is a damping force adjustable hydraulic shock absorber with a laterally-mounted control valve in which a valve device (only a valve case 6 of which is illustrated in FIG. 1) is laterally mounted on a lateral wall of a cylinder 2 (outer tube).

Figure 2:
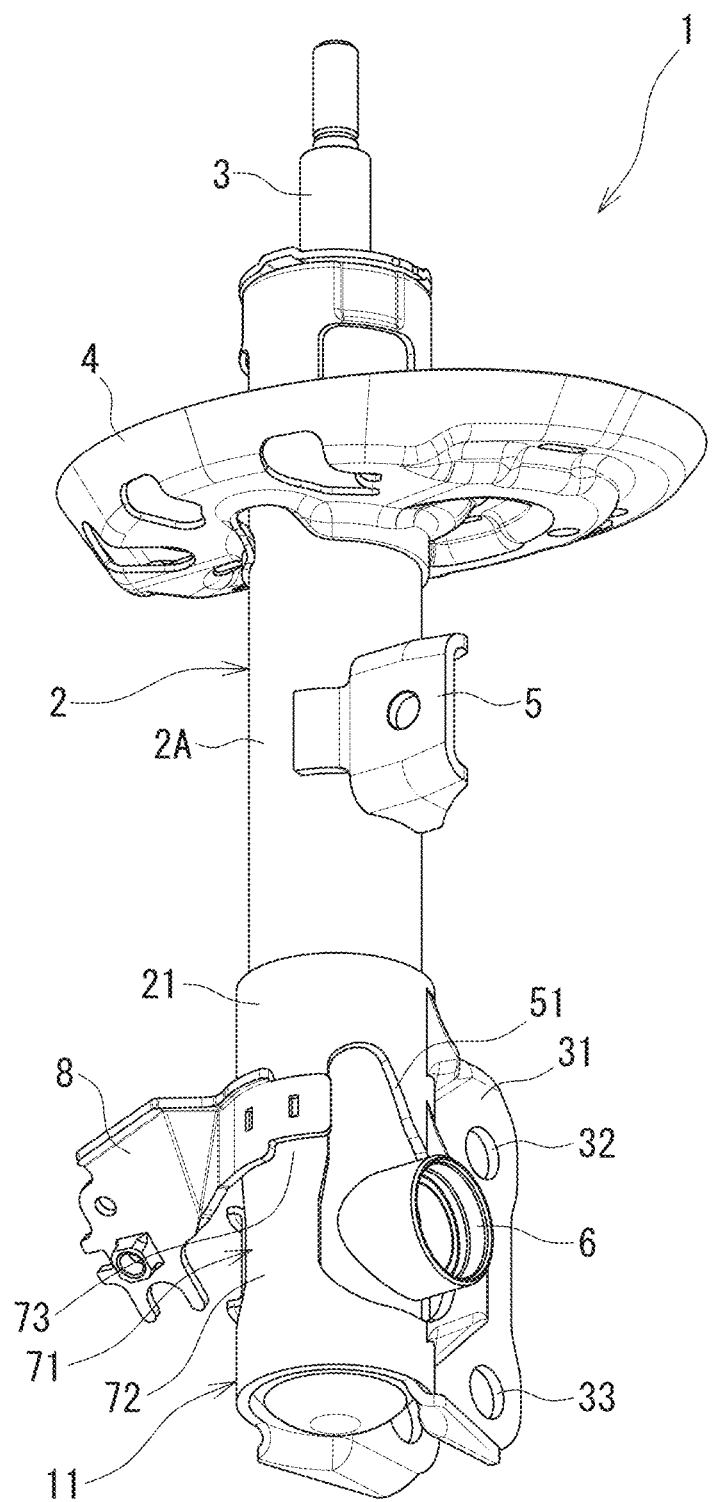
FIG. 2 is a perspective view of the shock absorber of the embodiment as viewed from a first hole side.
Figure 3:
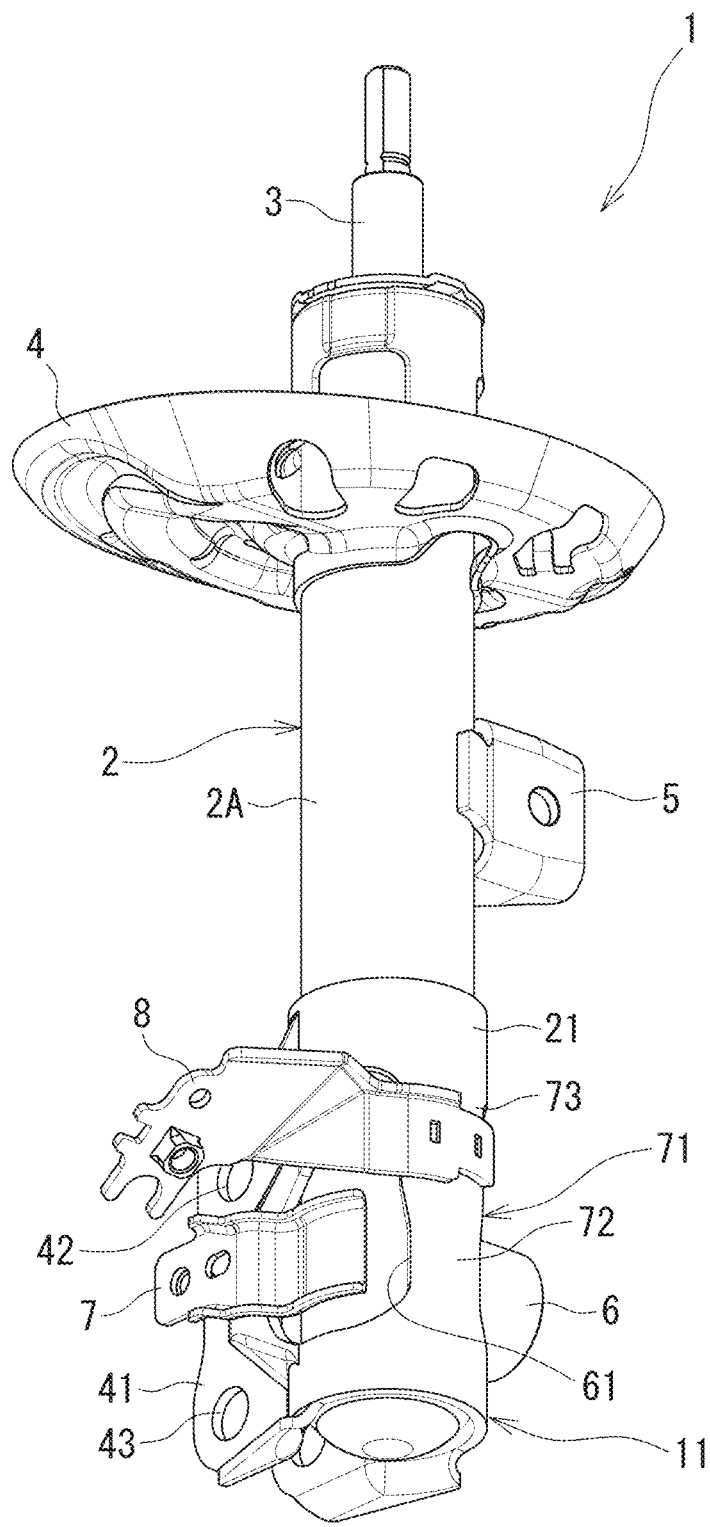
FIG. 3 is a perspective view of the shock absorber of the embodiment as viewed from a second hole side.

As illustrated in FIGS. 1 to 3, the shock absorber 1 includes a piston rod 3 protruding outside the cylinder 2. A spring bearing 4 and a bracket 5 are joined to an outer peripheral surface 2A of the cylinder 2. The spring bearing 4 receives a lower end of a coil spring, not shown. Linkage components and the like are connected to the bracket 5. A valve case 6 (protruding portion) having a cylindrical shape is provided to the lateral wall of the cylinder 2 to protrude in a radially outward direction of the cylinder 2.

The shock absorber 1 includes a bracket 11 that is provided to cover an outer periphery of the cylinder 2. The shock absorber 1 has a similar structure to a conventional damping force adjustable hydraulic shock absorber with a laterally-mounted control valve, except for being provided with the bracket 11. For the purpose of brevity of written description, the description will omit a detailed explanation on such a damping force adjustable hydraulic shock absorber with a laterally-mounted control valve.

Figure 4:
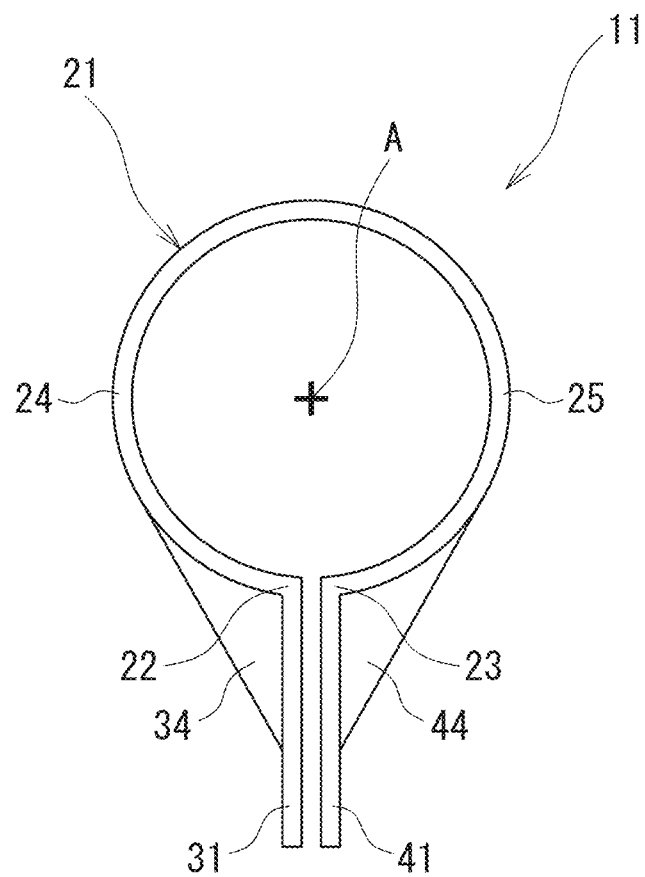
FIG. 4 is a top view (conceptual diagram) of a bracket according to the embodiment.
Figure 5:
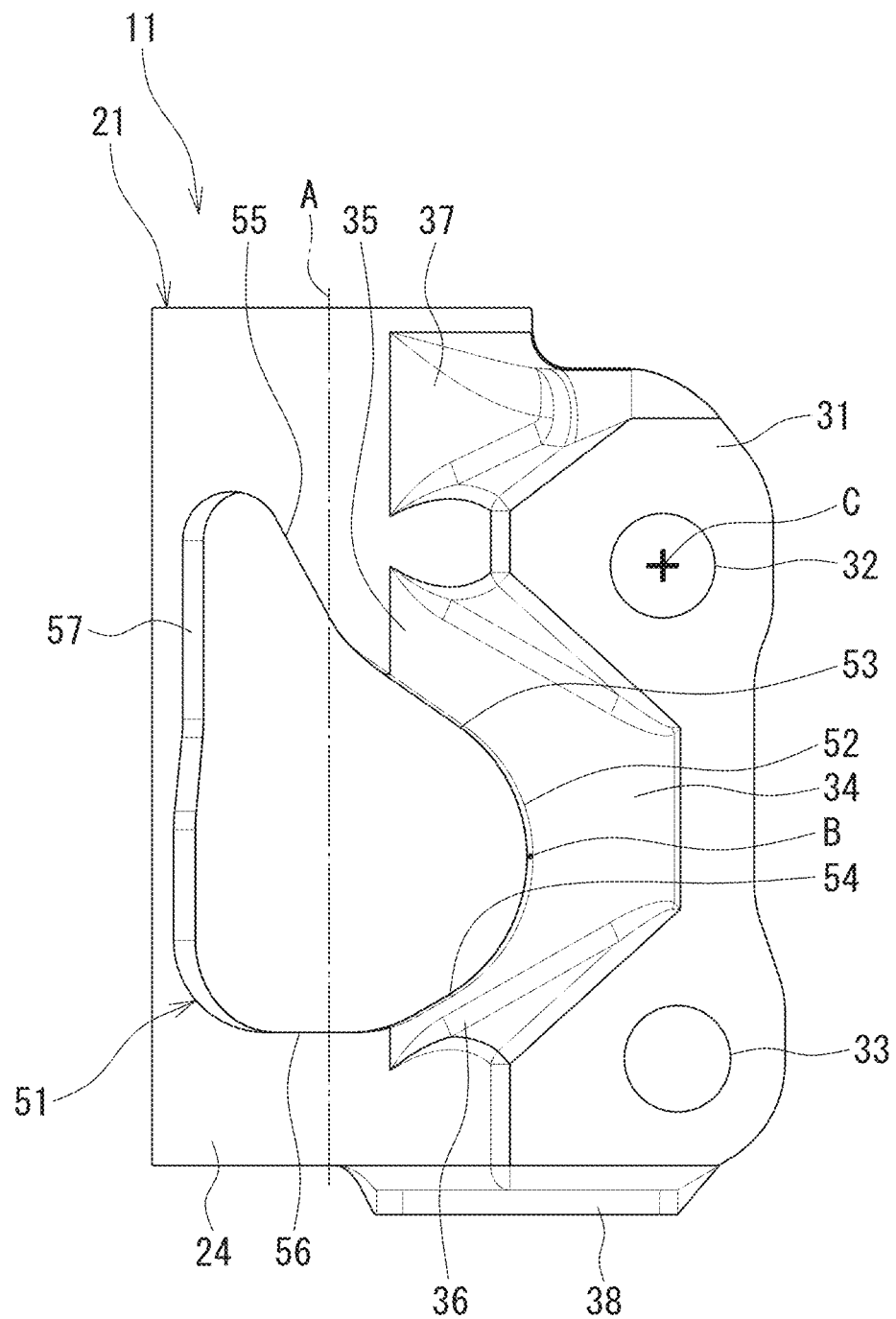
FIG. 5 is a left side view of the bracket according to the embodiment.
Figure 6:
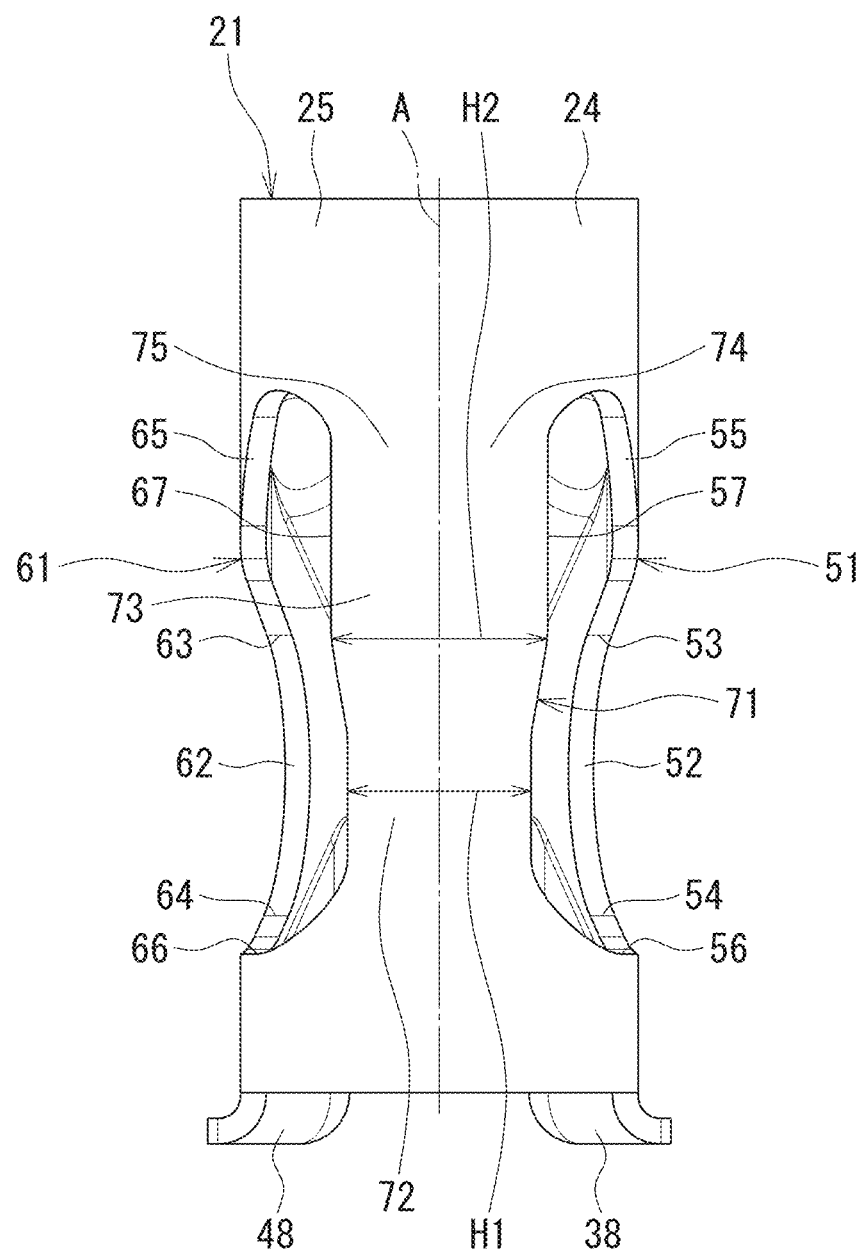
FIG. 6 is a rear view of the bracket according to the embodiment.

Referring to FIGS. 4 to 6, the bracket 11 includes a cylindrical portion 21. A cross-section in an axial direction (cross-section taken along a plane perpendicular to an axial line of the cylinder 2) of the cylindrical portion 21 is formed into a C-shape. The bracket 11 includes a pair of extending portion 31 and extending portion 41 which extend from a first end portion 22 and a second end portion 23 at respective circumferential ends of the cylindrical portion 21 radially outwards so as to face each other.

For the sake of convenience, the left side in FIG. 4 will be referred to as a left side of the bracket 11; the right side in FIG. 4 as a right side of the bracket 11; the lower side in FIG. 4 as a front side of the bracket 11; and the upper side in FIG. 4 as a rear surface side of the bracket 11. Accordingly, FIG. 4 is a top view of the bracket 11; FIG. 5 is a left side view of the bracket 11; and FIG. 6 is a rear view of the bracket 11. The bracket 11 is bilaterally symmetric about a vertical plane (hereinafter, referred to as "axial plane") including an axial center A (axial line).

As illustrated in FIGS. 2 and 5, the extending portion 31 is provided with a first extending portion's hole 32 and a second extending portion's hole 33 which are vertically distanced from each other. Bolts, not shown, to be fastened to a knuckle 10 (see FIG. 1) respectively extend through the first extending portion's hole 32 and the second extending portion's hole 33. The bracket 11 includes a reinforcing portion 34 that is formed to extend from a left side surface 24 of the cylindrical portion 21 to the extending portion 31. The reinforcing portion 34 is press-formed to expand in a radially outward direction of the cylindrical portion 21.

The reinforcing portion 34 includes a front-side ("right side" in FIG. 5) end extending into between the first extending portion's hole 32 and the second extending portion's hole 33. Positions (heights) of upper and lower ends of the reinforcing portion 34 in the axial direction (vertical direction) are substantially the same as axial positions of centers of the first and second extending portion's holes 32 and 33 of the extending portion 31. Since the bracket 11 is bilaterally symmetric about the axial plane as already mentioned, explanations of the extending portion 41 will be omitted. Elements included in the extending portion 41 which correspond to elements in the extending portion 31 are illustrated in the drawings with reference numerals obtained by adding 10 to reference numerals for the corresponding elements of the extending portion 31.

Provided above the reinforcing portion 34 and at a higher level (higher position) than the first extending portion's hole 32 is a reinforcing portion 37 that is formed to extend from an upper end portion of the left side surface 24 of the cylindrical portion 21 to an upper end portion of the extending portion 31. A lib 38 is formed at a lower end of the bracket 11. The lib 38 is formed to extend in the radially outward direction of the cylindrical portion 21 from the left side surface 24 of the cylindrical portion 21 over the first end portion 22 (see FIG. 4) to the extending portion 31.

As illustrated in FIGS. 1, 5 and 6, the bracket 11 includes a first hole 51 and a second hole 61 each having a fig-like shape which extend through the left side surface 24 and a right side surface 25 of the cylindrical portion 21. The first hole 51 includes an arc-like portion 52 extending to have a substantially arc-like shape in a left-side-surface view along an outer periphery of the valve case 6 which protrudes radially outwards from the lateral wall of the cylinder 2. The arc-like portion 52 is provided to contact the first end portion 22 (see FIG. 4) of the left side surface 24 of the cylindrical portion 21 at a contact point B. The cylindrical portion 21 side ("left side" in FIG. 5) of the reinforcing portion 34 is accordingly curved along the arc-like portion 52 of the first hole 51. In other words, the arc-like portion 52 (at least part of the first hole 51) is formed to extend to the reinforcing portion 34 in a circumferential direction of the cylindrical portion 21 and formed between an upper end portion 35 and a lower end portion 36 of the reinforcing portion 34 in the axial direction of the cylindrical portion 21.

The arc-like portion 52 includes a lower edge portion 56 extending in a circumferential direction from a lower end 54 of the arc-like portion 52 to a rear surface side of the arc-like portion 52 ("left side" in FIG. 5) and an upper edge portion 55 extending obliquely upwards from the upper end 53 of the arc-like portion 52 through an R portion (reference sign omitted) to the rear surface side of the arc-like portion 52. The upper edge portion 55 and the lower edge portion 56 are connected together through a longitudinal edge portion 57 extending in the axial direction (vertical direction). Since the bracket 11 is bilaterally symmetric about the axial plane as already mentioned, explanations of the second hole 61 will be omitted. Elements included in the second hole 61 which correspond to elements included in the first hole 51 are illustrated in the drawings with reference numerals obtained by adding 10 to reference numerals for the corresponding elements of the first hole 51.

The valve case 6 (protruding portion) protrudes from either one of the first and second holes 51 and 61. In the embodiment, the valve case 6 protrudes from the first hole 51. A bracket 7 is joined to the outer peripheral surface 2A of the cylinder 2 which is exposed from the inside of the second hole 61. Linkage components and the like are connected to the bracket 7.

As illustrated in FIG. 6, the bracket 11 comprises a bridge portion 71 that is provided at a center of a rear surface of the cylindrical portion 21, that is, on the opposite side of the axial center A from the extending portions 31 and 41 (see FIG. 4). In other words, the bridge portion 71 is provided on a circumferentially opposite side of the cylindrical portion 21 from a center position between the first and second end portions 22 and 23 of the cylindrical portion 21.

The bridge portion 71 is a straight portion that is provided between the longitudinal edge portion 57 of the first hole 51 of the left side surface 24 of the cylindrical portion 21 and a longitudinal edge portion 67 of the second hole 61 of the right side surface 25 of the cylindrical portion 21 and extends in the axial direction ("up-and-down direction" in FIG. 6) at a substantially horizontal position to the axial direction of the cylindrical portion 21 with respect to an axial center position C (see FIG. 5) of the first extending portion's hole 32. In other words, (at least part of) a left side surface 74 of the bridge portion 71 which is formed in the left side surface 24 of the cylindrical portion 21 is disposed at a substantially horizontal position to the axial direction of the cylindrical portion 21 with respect to the axial center position C of the first extending portion's hole 32.

The bridge portion 71 includes a decreased diameter portion 72 including a region (at least a part) in which width H1 in the circumferential direction ("right-and-left direction" in FIG. 6) of the cylindrical portion 21 is decreased. The decreased diameter portion 72 is so provided that a position (height) thereof in the axial direction ("up-and-down direction" in FIG. 6) substantially coincides with a position of the contact point B (see FIG. 5) between the arc-like portion 52 and the first end portion 22. In other words, the decreased diameter portion 72 is provided in the circumferential direction of the cylindrical portion 21 from the valve case 6 (protruding portion), that is, on a plane including an axial center (axial line) of the valve case 6.

The bridge portion 71 includes an increased diameter portion 73 including a region (at least a part) in which width H2 in the circumferential direction of the cylindrical portion 21 is increased. The increased diameter portion 73 is so provided that a position (height) thereof in the axial direction ("up-and-down direction" in FIG. 6) coincides with height between a position of the upper end 53 (see FIG. 5) of the arc-like portion 52 and the center position C (see FIG. 5) of the first extending portion's hole 32. As illustrated in FIGS. 2 and 3, an additional component 8, such as a harness bracket, is joined (welded) to the increased diameter portion 73 of the bridge portion 71.

In conventional brackets, a hole for allowing a valve case (protruding portion) to extend therethrough is formed to extend from both side portions of a cylindrical portion to a rear portion of the cylindrical portion. The cylindrical portion is shaped by press-forming a hole in sheet material (flat plate) and then curving the sheet material in which the hole is formed into a tube. However, it is difficult to shape the sheet material (flat plate) that is widely open at the center into a tube with high accuracy. The accuracy of the tube-like portion relates to shock absorber attachment rigidity against the lateral force to the anteroposterior direction of a vehicle in a situation where the bracket is used to attach the shock absorber to the knuckle. The issue is therefore to improve attachment rigidity by improving the formability of the bracket.

In contrast, according to the embodiment, the bracket 11 comprises the first hole 51 provided in the left side surface 24 of the cylindrical portion 21 and allowing the valve case 6 (protruding portion) to extend through the first hole 51, the second hole 61 provided in the right side surface 25 of the cylindrical portion 21 and disposed apart from the first hole 51, and the bridge portion 71 provided between the first hole 51 and the second hole 61 and disposed on the opposite side of the axial center A of the cylindrical portion 21 from the extending portions 31 and 41.

In the embodiment, the cylindrical portion 21 is shaped by press-forming the first hole 51 and the second hole 61 in the sheet material (flat plate) and then curving the sheet material into a tube, in which the bridge portion 71 is formed between the first hole 51 and the second hole 61. This improves the formability of the bracket as compared to conventional brackets which are not provided with the bridge portion 71, and therefore improves the accuracy (particularly, cylindricity) of the cylindrical portion 21. This results in improvement in attachment rigidity of the shock absorber 1 against the lateral force to the anteroposterior direction of the vehicle in a situation where the bracket 11 is used to attach the shock absorber 1 to the knuckle 10.

In the embodiment, the reinforcing portion 34 and a reinforcing portion 44 are formed to extend from the side surfaces 24, 25 of the cylindrical portion 21 to the extending portions 31, 41. The arc-like portion 52 and an arc-like portion 62 are part of the holes 51, 61. The arc-like portion 52 and an arc-like portion 62 are formed to extend to the reinforcing portions 34, 44 in the circumferential direction of the cylindrical portion 21. The arc-like portion 52 is formed between the upper end portion 35 and the lower end portion 36 of the reinforcing portion 34 in the axial direction of the cylindrical portion 21. The arc-like portion 62 is formed between an upper end portion 45 and a lower end portion 46 of the reinforcing portion 44 in the axial direction of the cylindrical portion 21. As a result of removal of regions (a region between the axial end portions 35, 36 of the reinforcing portion 34 and 45, 46 between the axial end portions of the reinforcing portion 44) with minimal impact on strength, it is possible to reduce weight and secure strength at the same time.

In the embodiment, since the bridge portion 71 is provided between the first hole 51 and the second hole 61, it is possible to reduce the weight of the bracket 11 due to the first and second holes 51, 61 and yet secure the attachment rigidity of the shock absorber 1 due to the bridge portion 71.

In the embodiment, the additional component 8 (fixing member), such as a harness bracket, is joined by welding to the increased diameter portion 73 of the bridge portion 71. As compared to a case in which the additional component 8 is welded to the outer peripheral surface 2A of the cylinder 2, the embodiment is capable of suppressing embrittlement of material of the cylinder 2 which is caused by welding heat effect and securing the attachment rigidity of the shock absorber 1.

In the embodiment, the decreased diameter portion 72 is provided in the bridge portion 71 at the position in the circumferential direction of the cylindrical portion 21 from the valve case 6. When the valve case 6 is joined (welded) to the cylinder 2, therefore, a gap can be secured between the valve case 6 and the bridge portion 71.

The invention is not limited to the embodiment and may be modified in various ways. For example, the embodiment is intended to facilitate the understanding of the invention and does not necessarily have to comprise all the configurations explained above. The configuration of each embodiment may be partially replaced with another configuration or incorporated with another configuration. It is also possible to incorporate, omit or replace a part of the configuration of one of the embodiments into, from or with the configuration of another one of the embodiments.

The present application claims priority under Japanese Patent Application No. 2022-15777 filed on Feb. 3, 2022. The entire disclosure of Japanese Patent Application No. 2022-15777 filed on Feb. 3, 2022 including the description, claims, drawings and abstract, is incorporated herein by reference in its entirety.

REFERENCE SIGN LIST

1 Shock absorber; 2 Cylinder; 6 Valve case (protruding portion); 11 Bracket; 21 Cylindrical portion; 22 First end portion; 23 Second end portion; 31, 41 Extending portion; 51 First hole; 61 Second hole; 71 Bridge portion

The invention claimed is:

1. A shock absorber comprising:
a tube-like cylinder;
a protruding portion that is so provided as to protrude in a radially outward direction of the cylinder; and
a bracket that is provided at an outer periphery of the cylinder,
the bracket comprising:
a cylindrical portion including a first end portion and a second end portion in a circumferential direction of the cylindrical portion, the cylindrical portion having a cross-section in an axial direction of the cylindrical portion, the cross-section in the axial direction being formed into a C-shape, the cylindrical portion covering the outer periphery of the cylinder;
a pair of extending portions respectively extending from the first end portion and the second end portion of the cylindrical portion in the radially outward direction of the cylindrical portion so as to face each other;
a first hole that is provided in the cylindrical portion and allows the protruding portion to extend through the first hole in the radially outward direction of the cylindrical portion;
a second hole that is provided in the cylindrical portion and disposed apart from the first hole; and
a bridge portion that is formed between the first hole and the second hole and provided on an opposite side of an axial center of the cylindrical portion from the pair of extending portions,
wherein the bridge portion includes a decreased width portion that is at least partially decreased in width, the decreased width portion being provided in the circumferential direction of the cylindrical portion from the protruding portion.

2. The shock absorber according to claim 1,
wherein a fixing member is provided at a radially outer side of the bridge portion.

3. The shock absorber according to claim 2,
wherein the fixing member is provided to an increased width portion of the bridge portion which is at least partially increased in width.

4. The shock absorber according to claim 1, including:
reinforcing portions that are provided at a radially outer side of the cylindrical portion and formed to extend from the cylindrical portion to the respective extending portions,
wherein the first hole or the second hole is at least partially formed to extend to the corresponding reinforcing portion in the circumferential direction of the cylindrical portion and formed between end portions of the corresponding reinforcing portion which are located in an axial direction of the cylindrical portion.

5. The shock absorber according to claim 1,
wherein a first extending portion's hole and a second extending portion's hole are formed in the pair of extending portions, the first extending portion's hole allowing a rod-like member to extend through the first extending portion's hole, and the second extending portion's hole being disposed apart from the first extending portion's hole and allowing a rod-like member to extend through the second extending portion's hole, and
wherein at least a part of the bridge portion is disposed at a substantially horizontal position to the axial direction of the cylindrical portion with respect to an axial center position of the first extending portion's hole.

6. The shock absorber according to claim 5,
wherein the bridge portion is a straight portion that extends in the axial direction of the cylindrical portion at the substantially horizontal position to the axial direction of the cylindrical portion with respect to the axial center position of the first extending portion's hole.

7. The shock absorber according to claim 1,
wherein the bridge portion is formed between the first hole and the second hole and provided on a circumferentially opposite side of the cylindrical portion from a center position of the cylindrical portion which is located between the first end portion and the second end portion.

8. A shock absorber comprising:
a tube-like cylinder;
a protruding portion that is so provided as to protrude in a radially outward direction of the cylinder; and
a bracket that is provided at an outer periphery of the cylinder,
the bracket comprising:
a cylindrical portion including a first end portion and a second end portion in a circumferential direction of the cylindrical portion, the cylindrical portion having a cross-section in an axial direction of the cylindrical portion, the cross-section in the axial direction being formed into a C-shape, the cylindrical portion covering the outer periphery of the cylinder;
a pair of extending portions respectively extending from the first end portion and the second end portion of the cylindrical portion in the radially outward direction of the cylindrical portion so as to face each other;
a first hole that is provided in the cylindrical portion and allows the protruding portion to extend through the first hole in the radially outward direction of the cylindrical portion;
a second hole that is provided in the cylindrical portion and disposed apart from the first hole; and
a bridge portion that is formed between the first hole and the second hole and provided on an opposite side of an axial center of the cylindrical portion from the pair of extending portions,
the shock absorber further including:
reinforcing portions that are provided at a radially outer side of the cylindrical portion and formed to extend from the cylindrical portion to the respective extending portions,
wherein the first hole or the second hole is at least partially formed to extend to the corresponding reinforcing portion in the circumferential direction of the cylindrical portion and formed between end portions of the corresponding reinforcing portion which are located in an axial direction of the cylindrical portion.

* * * * *